US006536109B2

(12) United States Patent
Berthelet et al.

(10) Patent No.: US 6,536,109 B2
(45) Date of Patent: Mar. 25, 2003

(54) METHOD FOR EXTENDING THE LIFE OF ATTACHMENTS THAT ATTACH BLADES TO A ROTOR

(75) Inventors: Benoît Jean Henri Berthelet, Maisons Alfort (FR); Francis Lucien Guy Chareyre, Franconville (FR); Willy Lionel Fradin, Vaux sur Vienne (FR); Hakim Hoffmann, Naintre (FR); Stéphane Michel Kerneis, Velizy (FR); Marie-Christine Marcelle Ntsama-Etoundi, Charenton le Pont (FR); Guillaume François Roger Simon, Montigny le Bretonneux (FR)

(73) Assignees: Snecma Moteurs, Paris (FR); Snecma Services, Paris (FR)

( * ) Notice: Subject to any disclaimer, the term of this patent is extended or adjusted under 35 U.S.C. 154(b) by 0 days.

(21) Appl. No.: 09/987,860

(22) Filed: Nov. 16, 2001

(65) Prior Publication Data

US 2002/0124402 A1 Sep. 12, 2002

(30) Foreign Application Priority Data

Nov. 16, 2000 (FR) ........................................... 00 14767

(51) Int. Cl.$^{7}$ ................................................ B23P 15/00

(52) U.S. Cl. ...................... 29/889.1; 29/90.7; 29/889.2; 29/889.21; 29/889.22

(58) Field of Search ............................... 29/889.1, 90.7, 29/889.21, 889.22, 889.2; 72/53, 430, 707; 416/241 R, 128.5

(56) References Cited

U.S. PATENT DOCUMENTS 3,482,423 A * 12/1969 Murray ........................ 451/29
3,668,913 A * 6/1972 Morris ........................ 269/57
4,419,875 A * 12/1983 DeClark et al. ............... 72/53
4,426,867 A 1/1984 Neal et al.
5,499,519 A * 3/1996 Brunier et al. ................ 451/39
5,620,307 A * 4/1997 Mannava et al. ........... 148/525
5,846,057 A * 12/1998 Ferrigno et al. ......... 219/121.6
5,950,470 A * 9/1999 Prewo et al. ................. 72/430
6,170,308 B1 * 1/2001 Veronesi et al. ............. 29/90.7
6,289,705 B1 9/2001 Duquenne et al.
6,336,844 B1 1/2002 Duquenne et al.
6,340,500 B1 * 1/2002 Spitsberg ................ 416/241 R

FOREIGN PATENT DOCUMENTS

| | | |
|---|---|---|
| EP | 0 922 532 | 6/1999 |
| EP | 1 101 827 | 5/2001 |
| FR | 2 714 629 | 7/1995 |
| FR | 2 743 742 | 7/1997 |

OTHER PUBLICATIONS

R. Fabbro, et al., Souder, No. 5, pp. 9–16, "Le Pricipe du Choc Laser et ses Applications au Traitement des Materiaux", Sep. 1998.

Y. Le Guernic, CETIM, pp. 105–123, "Choix des Parametres de Grenaillage et Exemples d'Applications", 1992.

* cited by examiner

*Primary Examiner*—I Cuda Rosenbaum
(74) *Attorney, Agent, or Firm*—Oblon, Spivak, McClelland, Maier & Neustadt, P.C.

(57) ABSTRACT

A method for extending the life of the attachments that attach blades to rotors, particularly for aerojet engines. Such a method is notable in that it employs intensive ultrasonic peening of the grooves and of the roots of the blades, this peening being performed with an Almen intensity at least equal to F8A, so as to increase the compressive prestress in the contact surfaces without increasing the roughness of these surfaces.

8 Claims, 6 Drawing Sheets

METHOD FOR EXTENDING THE LIFE OF ATTACHMENTS THAT ATTACH BLADES TO A ROTOR

BACKGROUND OF THE INVENTION

1. Field of the Invention

The invention relates to the attachments that attach blades to a rotor and more specifically to a method for extending their life, this method employing a particular embodiment of the "ultrasonic" peening technique.

2. Technological Background

In an aerojet engine, the bladed rotors traditionally consist of a rim, at the periphery of which a number of removable blades are mounted. The mounting device is known in this patent application as a "blade attachment". This device comprises a dovetail groove machined in the rim and a root also in the shape of a dovetail machined at the base of the blade, assembly being by fitting the root into the groove. In a more elaborate embodiment known as the "Christmas tree root" embodiment, the dovetail has several "bulbs" of decreasing size, typically three bulbs, each bulb separately performing the function of the dovetail. In what follows, the term "dovetail attachments" encompasses these two forms of attachment. The blade roots are fitted into the grooves by sliding with limited clearance, the roots then being immobilized without clearance by various locking means. It will be understood that the grooves and the blade roots are the site of high stress concentrations and that they therefore have to be produced with particular care. Turbojet rotors are conventionally made of steel, titanium alloy or a nickel or chromium-based superalloy.

Conventionally, rotors undergo peening by projecting small beads made of a hard material using one or more compressed-air nozzles. This peening has the effect of creating compressive prestress at the surface of the rotor over a depth of a few tenths of a millimeter, this prestress delaying the onset of cracks resulting from the high stresses and thus extending the life of the rotor. If need be, peening is preceded by a heat treatment of the part to be treated in order to relieve the residual stresses that remain in this part. When certain portions of the part do not need to be peened, they are customarily protected by coating them with a material, such as an elastomer, that has sufficient hardness to resist the impact of the beads.

Intensive peening with an Almen intensity of the order of F15A to F17A and making it possible to create a compressive prestress of the order of 900 to 1100 MPa (mega pascals) at the surface of the rotor is desirable, these rotors customarily being made of steel, of titanium alloy or of chromium-based or nickel-based superalloy. Unfortunately, such peening greatly increases the roughness of the treated surfaces and thus reduces the resistance to wear by vibrational friction of the surfaces of the grooves and of the blade roots which are in mutual contact.

This increase in the roughness of a surface undergoing intensive peening by the blasting of small beads is backed by various documents:

Patent EP 0 922 532 paragraph [0005] column 1, lines 33 to 38. One of the recommended solutions is to reduce the intensity and coverage of the peening, paragraph [0006], lines 39–40. This same patent indicates at line 41 that this may result in a reduction in the life of the part. In the magazine "Souder [Welding]" No. 5 of September 1998, the study "Le principe du choc laser et ses applications au traitement des matériaux [The principle of laser shock and its applications to materials treatment]" makes a comparison between "laser shock" peening and conventional peening and indicates in the penultimate paragraph of page 13 that conventional peening creates microcraters resulting from the impacts of the beads and increasing roughness. According to the examples given in the first table on page 14, the roughness (Ra) of a machined surface can increase from 2.3 $\mu$m to 5.5 $\mu$m after intensive peening The article "Le grenaillage de précontrainte [Prestressing peening]", published in 1992 by CETIM page 105–123 reports a national conference held on Sep. 25 and 26, 1991 at Senlis in France. In the penultimate paragraph of page 108, it indicates that the peening of a machined surface leads to an increase in the roughness value. This same article specifies, in the last paragraph of this same page, that the roughness can be reduced by performing the peening in several passes of decreasing intensity. It should be understood that intensive peening to start with increases the roughness and that the increasingly lighter peening operations which follow reduce the roughness by evening out the peened surface. This solution does, however, have the disadvantage of being lengthy because several peening operations are needed, the first prestressing the peened surface and the next peening operations gradually reducing the roughness which appeared during the first peening operation.

The problem to be solved is that of simultaneously increasing the fatigue strength and the resistance to vibrational friction of the rotors at the blade attachments, it being necessary for this increase not to lead to an appreciable increase in the time and cost involved in manufacturing the rotors.

Peening by blasting beads is currently experiencing a new embodiment known as "ultrasonic peening" where the beads are no longer blasted out of a nozzle by a jet of compressed air but by the percussion against these beads of the surface of a sonotrode vibrating at frequencies of the order of 20 to 60 kHz, the beads being kept inside a chamber, the part to be peened being, depending on its dimensions, immersed inside the chamber or offered up to an opening of this chamber.

Patent FR 2 743 742 discloses an application of ultrasonic peening to cookware allowing the microcavities created beforehand on the surface of the utensil to be reduced to encourage the adhesion of a coating to part of the utensil. This patent indicates, on page 5 line 32, that the cookware is made of aluminum. It is known that that material is soft, and its prestressing does not exceed 150 to 200 MPa. It is very much below the desired prestressing of 900 to 1100 MPa. That patent also indicates on page 1, line 31 that the surface obtained is smooth, but specifies on page 5, line 14 that the peening (which it refers to as "billage") lasts from 0.5 to 5 seconds. Even for a soft material, this then is only a very light surface peening that is in no way comparable with the intensive compressive prestressing peening operations carried out on aeronautical parts, the surfaces of these parts having to be exposed to the peening for a duration of 4 to 10 minutes at least. That patent therefore provides no solution to the problem that is to be solved.

SUMMARY OF THE INVENTION

According to the invention, for a rotor blade assembly comprising a rotor and a plurality of blades removably attached to said rotor, said rotor comprising a rim having a periphery to which each of said plurality of blades is attached by attachments comprising first and said second components, said first component comprising a dovetail groove arranged in said periphery of said rim, and said second component comprising a root formed on said blade, said root being of a shape that complements said groove and being able to be fitted into said groove so as to attach said blade to said rim, there is provided a method for extending the life of said attachments by peening a surface of at least one of said first and second components so as to create compressive prestress at said surface, said method comprising the steps of:

providing a sonotrode which is adapted to be vibrated ultrasonically;

forming a chamber which is delimited at least partly by said sonotrode and the surface which is to be peened;

providing a plurality of beads in said chamber; and vibrating said sonotrode whereby said beads are mobilized in said chamber by the percussion of said sonotrode so that said beads are projected against said surface to effect untrasonic peening of said surface with an Almen intensity at least equal to F8A.

The inventors have found that intensive ultrasonic peening only slightly increases the roughness of the treated part, unlike conventional peening employing a nozzle with a jet of compressed air. The invention thus puts this unexpected property to use to increase the fatigue strength of the blade attachments while at the same time maintaining good resistance to wear by vibrational friction.

One advantage of the invention is that it also increases the resistance to wear by vibrational friction of the blade attachments, because the high compressive prestressing of the surfaces of the components of the blade attachments causes them to harden by work hardening. Advantageously, use will be made of beads with a diameter at least equal to 0.8 mm so as to improve the effectiveness of the peening and to stabilize or even reduce the roughness of the treated parts.

Advantageously, the compressive prestress will be at least equal to 500 MPa.

According to one particular embodiment of the invention the method is applied to “axial” grooves on the rims of bladed rotors, wherein said dovetail grooves are arranged axially in said periphery of said rim, said axial grooves being approximately straight and open at each end, and wherein said sonotrode is capable of being introduced into said grooves and includes means for sealing said sonotrode in said grooves and two wings capable of covering said open ends of said grooves and of closing them off with a clearance smaller than the diameter of said beads, said method further comprising the steps of:

arranging said rim above said sonotrode in an appropriate position for bringing each axial groove over said sonotrode by rotating said rim about its geometric axis, arranging said plurality of beads on said sonotrode, turning said rim to bring each axial groove in turn over said sonotrode, each axial groove then being subjected to the steps of:

- covering said open ends with said wings and bringing said sonotrode into said axial groove,
- peening said axial groove by setting said sonotrode in vibration,
- withdrawing said sonotrode.

According to another particular embodiment of the invention, the method is applied to “annular” grooves on the rims of bladed rotors, wherein said dovetail grove is arranged annularly in said periphery of said rim, said annular groove including a mouth, and a local opening for insertion or removal of said roots of said blades, and wherein said sonotrode is capable of being introduced into said mouth of said annular groove and includes means for sealing said sonotrode in said mouth, and two wings are capable of passing into said annular groove with a clearance smaller than the diameter of said beads, said method further comprising the steps of:

arranging said rim over said sonotrode in an appropriate position for causing said annular groove to travel over said sonotrode by rotating said rim about its geometric axis, arranging said plurality of beads on said sonotrode, presenting said local opening over said sonotrode, bringing said sonotrode and said two wings into said local opening, said sonotrode being level with said mouth and aligned with said mouth, said two wings lying one on each side of said sonotrode and aligned with said axial groove, turning said rim and setting said sonotrode in vibration when said two wings and said sonotrode are in said annular groove, stopping said sonotrode as soon as a wing comes out in said local opening, stopping rotation when both wings and said sonotrode are in said local opening.

According to another particular embodiment of the invention, the method is applied to the roots of the blades, wherein use is made of a chamber including a bottom, said bottom having an opening through which said sonotrode passes with a clearance smaller than the diameter of said beads, said chamber being covered by a thin lid, said lid having a number of openings of a shape that complements said roots, the distance between said lid and said sonotrode being at least equal to the height of said roots, said method further comprising the steps of:

introducing said plurality of beads into said chamber, introducing said roots into said openings of the lid and immobilizing said blades;

setting said sonotrode in vibration to carry out said peening.

BRIEF DESCRIPTION OF THE DRAWINGS

FIG. 8 is a section on D of FIG. 9, this FIG. 9 itself being a section on C of FIG. 8.

DESCRIPTION OF THE EMBODIMENTS OF THE INVENTION

Tests have shown that intense “ultrasonic” peening does not appreciably increase the roughness of the treated surfaces, unlike conventional peening involving blasting the beads using a nozzle with a jet of compressed air. The table below shows some comparative results obtained on a part made of nickel-chrome-based refractory superalloy:

the first row shows the roughnesses (Ra) measured before peening, the second row shows the roughnesses (Ra) measured on the same surfaces after conventional peening with a high Almen intensity of F17A and prestressing of as much as 1000 MPa under the peened surface, the third row shows the roughnesses (Ra) measured on these same surfaces after ultrasonic peening equivalent to the previous peening operation with an Almen intensity of F17A with prestressing of as much as 1000 MPa under the surfaces.

| | Surface 1 (milled) | Surface 2 (turned) |
|---|---|---|
| Roughness (Ra) before peening | 0.27 μm | 0.90 μm |
| Roughness (Ra) after conventional peening, Almen intensity = F17A, bead Ø = 0.315 mm | 1.53 μm | 1.94 μm |
| Roughness (Ra) after ultrasonic peening, Almen intensity = F17A, bead Ø = 1.5 mm | 0.47 μm | 0.93 μm |

In a first example illustrated in column 1, surface 1, machined by milling with a roughness Ra=0.27 μm, has its roughness increased by 1.26 μm after conventional peening, whereas its roughness increases only by 0.2 μm with ultrasonic peening, this surface 1 being arranged parallel to the sonotrode.

In a second example illustrated in column 2, surface 2, machined by turning with a roughness Ra=0.90 μm, has its roughness increased by 1.04 μm after conventional peening, whereas this roughness remains practically unchanged after ultrasonic peening, this surface 2 this time being arranged at right angles to the sonotrode.

Figure 1:
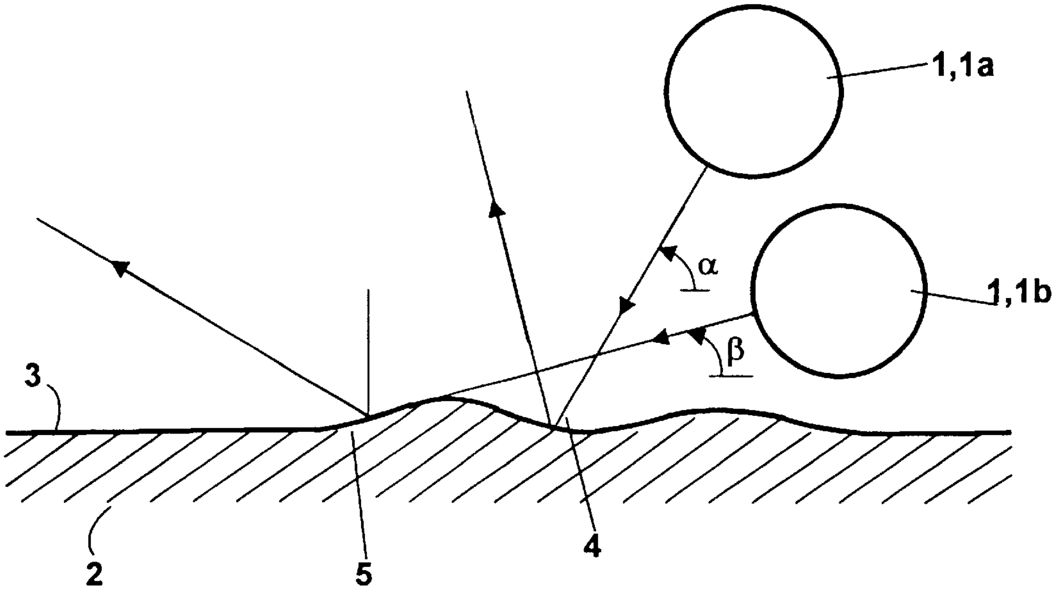
FIG. 1 illustrates the deformation of material under the effect of the impacts of moving beads.

This remarkable property of ultrasonic peening, which enables intensive peening without appreciably increasing the roughness of the treated surface, could be explained thus in the light of FIG. 1: the beads 1 supplied with kinetic energy by the percussions of the vibrating sonotrode bounce off the sonotrode itself onto the walls of the chamber and onto the surface 3 of the part 2 being peened, these beads 1 then bouncing off this surface at an angle α, β of incidence which is random with a roughly uniform distribution between 0 and 90° and in any direction. This being the case, the beads 1*a* impacting the surface to be peened at an angle α close to the normal to this surface will be effective in creating significant compressive prestress at the points of impact, these beads however leaving, on the impacted surface 3, craters 4 which are surrounded by bulges 5 that form rough patches. Conversely, the beads 1*b* impacting the surface 3 at a small angle β, that is to say rather skimming the surface 3, will tend to even out the bulges 5 and to at least partially refill the craters 4, these beads 1*b* obviously not being very effective or not being effective at all at creating sufficient compression prestress. The role of the skimming beads is confirmed by the previous table. In effect, surface 2 receives rather more skimming beads because it is ultrasonically peened in a position perpendicular to the sonotrode, which explains why the roughness practically does not increase.

It can therefore be said that intensive peening that does not appreciably increase the roughness of the peened surface 3 needs to be able to combine, on the treated surface, impacts of beads 1*a* at angles of incidence α close to the normal to this surface 3 and impacts of beads 1*b* skimming this surface. An angle of incidence α close to the normal to the surface is to be understood as meaning an angle α at least equal to 45°, the effectiveness of the impact being better the closer this angle α is to 90°. A skimming angle of incidence β is to be understood as being an angle β less than 45° and preferably of between 15° and 30°.

It will be noted that intensive peening according to the invention also entails a "coverage" ranging from 120% to 300%, that is to say that peening is performed for a duration T equal to 120% to 300% of the duration T1 needed to obtain a normal coverage of 98%, the normal coverage being the ratio between the impacted area and the total area exposed to peening.

However, in the case of conventional peening, the beads strike the peened surface with an angle of incidence and a preferred direction, this angle of incidence having to be high enough to prestress the peened surface. As a result, the bulges that form around the craters are not evened and, on the contrary, tend to collect in ripples which are clearly visible under a microscope with a magnification of ×50 to ×100, the craters tending themselves to collect in furrows more or less perpendicular to the ripples.

A not insignificant advantage of ultrasonic peening is that it requires only a small quantity of beads to implement it. It is therefore possible to use high-quality beads comparable with steel or ceramic ballbearings. Unlike conventional peening, these beads are perfectly spherical and therefore give a better surface finish, and are very hard, so do not break and therefore do not produce sharp edges likely to damage the surface finish of the peened part.

Figure 2:
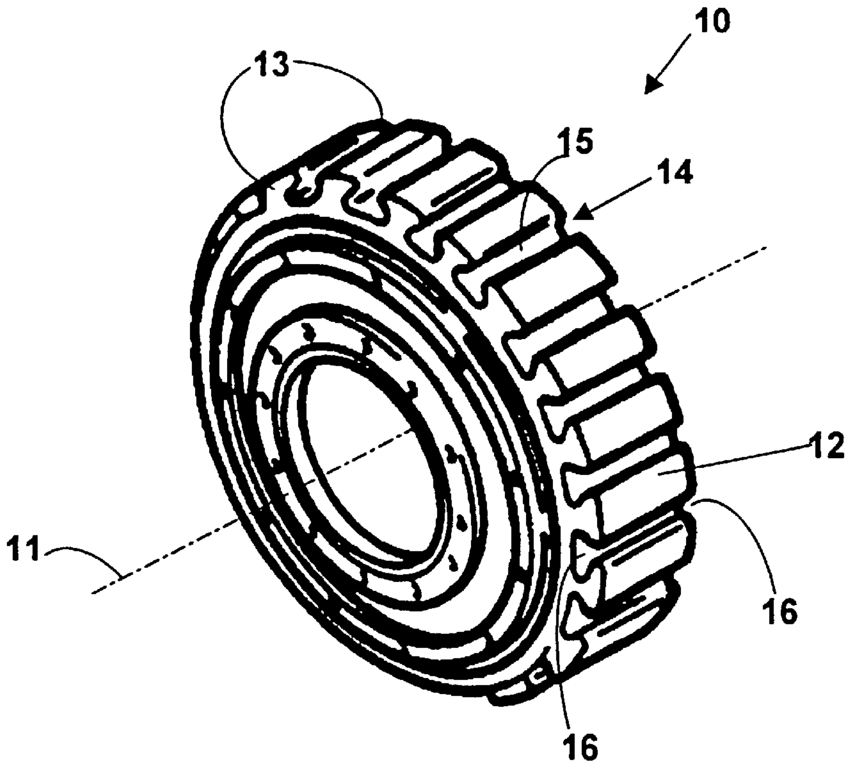
FIG. 2 is a perspective view of a rim of a rotor showing “axial” grooves at its periphery.

Reference will now be made to FIG. 2. The bladed rotor comprises a rim 10 having an overall shape of revolution about a geometric axis 11, this rim 10 being radially bounded toward the outside by a peripheral surface 12 and laterally by two flanks 13. The rim 10 at its periphery 12 has a number of approximately straight "axial" grooves 14 each having a mouth 15 extended laterally by two lateral openings 16, the mouth 15 opening onto the periphery 12, and the lateral openings 16 opening onto the flanks 13. The grooves 14 have an approximately trapezoidal "dovetail" profile with a narrower mouth 15. These grooves 14 may be parallel to the geometric axis 11 or may be oblique. They may be straight or in the shape of a circular arc.

Figure 3:
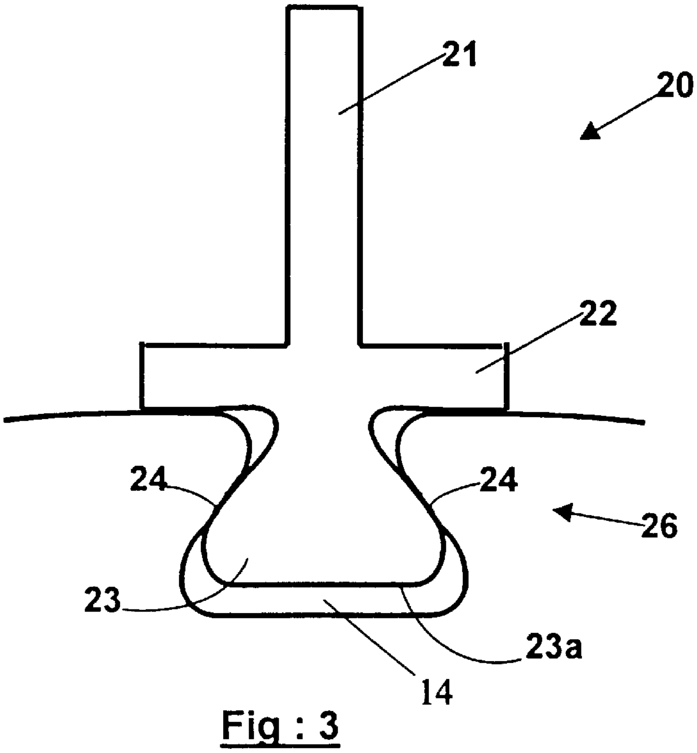
FIG. 3 is a front view of a blade mounted in an axial groove of the rim of FIG. 2.

Reference will now be made to FIG. 3. A blade 20 comprises, in succession from top to bottom in this figure, a thin aerofoil 21, a platform 22 extending laterally on each side of the blade 20, and a root 23 of approximately trapezoidal shape that complements the shape of the groove 14. The blade 20 is fitted via its root 23 into the groove 14 with limited clearance, the root 23 then being immobilized in the groove 14 by various locking means not depicted. The root 23 comes into contact with the groove 14 along two lines of contact 24 situated to the rear of the mouth 15 and set back from this mouth 15. The attachment 26 for attaching the blade 20 comprises the groove 14 and the root 23.

Figure 4:
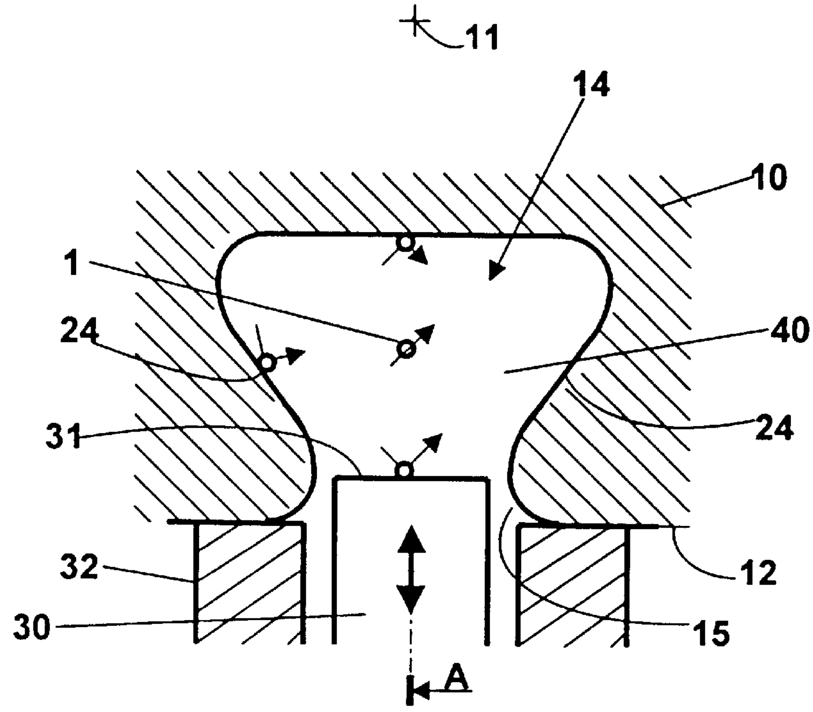
FIGS. 4 and 5 illustrate, in a front view and in a profile view respectively, a method of ultrasonically peening the axial grooves, FIG. 4 being a view in section on B of FIG. 5, FIG. 5 being a view in section on A of FIG. 4.
Figure 5:
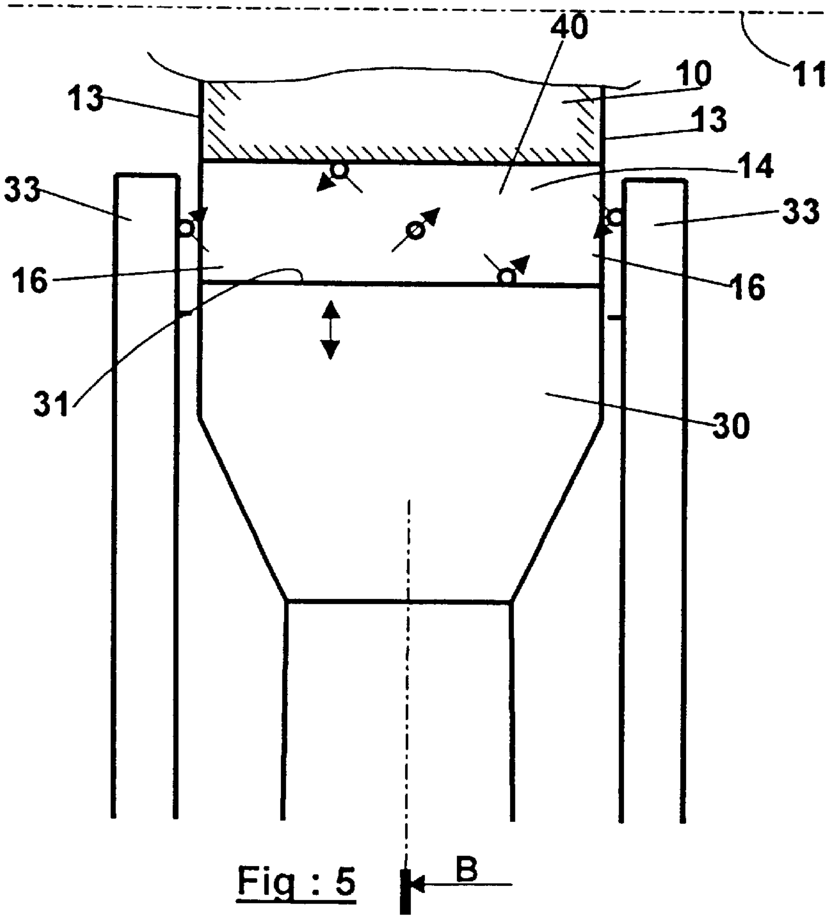

Reference will now be made simultaneously to FIGS. 4 and 5. A sonotrode 30 comprises a vibrating surface 31 capable of being introduced into the mouth 15 of the groove 14. The sonotrode 30 slides in a sleeve 32 with a clearance smaller than the diameter of the beads 1. The sealing of the sonotrode 30 against the beads with respect to the mouth 15 may be provided by the sleeve 32. In a preferred embodiment, however, this sealing is provided more simply by giving the sonotrode 30 a shape that complements that of the mouth 15, for example a rectangular shape in the case of straight grooves, with a clearance smaller than the diameter of the beads 1. The sleeve 32 supports two stoppers or wings 33 one on each side of the sonotrode 30, these wings being capable of covering the openings 16 of the groove 14 with a clearance smaller than the diameter of the beads 1. It will be understood that the sonotrode 30 and the wings 33 collaborate to close the groove 14 and contain the beads in this groove 14 during peening.

With such a device, the method for the ultrasonic peening of the axial grooves 14 comprises the following operations:

- arranging the rim 10 above the sonotrode 30 in an appropriate position for bringing each axial groove 14 over the sonotrode 30 by rotating the rim 10 about its geometric axis 11,
- arranging a dose of beads 1 on the sonotrode 30, the sonotrode preferably being retracted into the sleeve 32 so as to constitute, above its vibrating surface 31, a receptacle capable of containing the beads 1,
- turning the rim 10 to bring each axial groove 14 in turn over the sonotrode 30, each axial groove 14 then being subjected to the following operations:
  - covering the lateral openings 16 with the wings 33 and bringing the sonotrode 30 into the mouth 15 of the axial groove 14, this operation being performed preferably by simultaneously raising the sonotrode 30 and the sleeve 32 until the wings 33 cover the openings 16, the sonotrode 30 then being raised alone into the mouth 15, which has the effect simultaneously of bringing the beads 1 into the groove 14 and of placing the sonotrode 30 in the working position,
  - peening the axial groove 14 by setting the sonotrode 30 in vibration,
  - withdrawing the sonotrode 30.

It is advantageous for the vibrating surface 31 of the sonotrode 30 to be brought into the mouth 15 itself, the vibrating surface 31 being more or less level with the narrowest section of this mouth. This has the effect of improving the homogeneity and isotropy of the plurality of beads 1 produced inside the groove 14, so as to better combine intensive prestressing and low roughness particularly on the lines of contact 24 at the rear and set back from the mouth 15, and protecting the mouth 15 itself from peening, this mouth 15 forming roughnesses and therefore likely to be crushed by the impacts of the beads 1.

Figure 6:
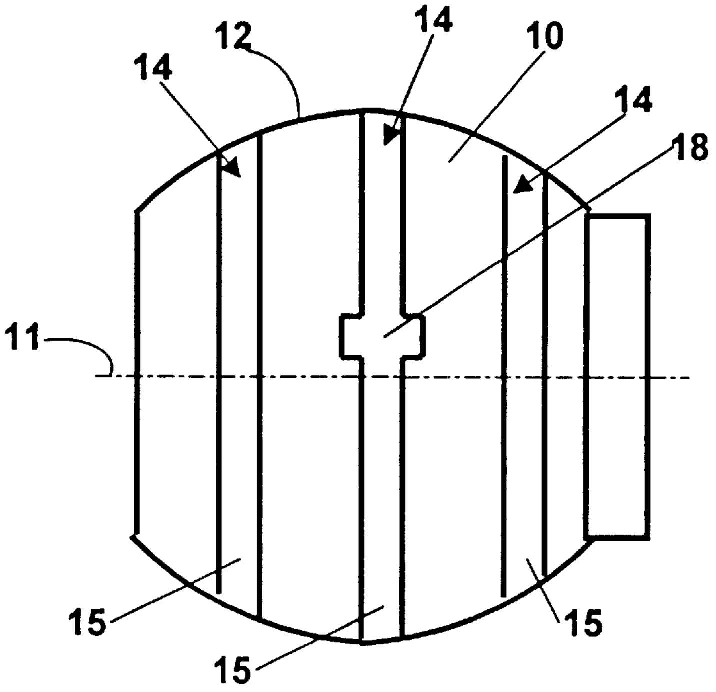
FIG. 6 is a side view of a rim of a rotor with “annular” grooves.

Reference will now be made to FIG. 6. The bladed rotor in this second example comprises a rim 10 having an overall shape of revolution about a geometric axis 11, this rim 10 being bounded radially toward the outside by an annular peripheral surface 12. In this example, the rim 10 comprises, at the periphery 12, three annular grooves 14, the descriptions of which are identical: each annular groove 14 comprises a mouth 15 which is also annular and opens onto the periphery 12. Each groove also includes a local opening 18 also opening onto the periphery 12. Each annular groove 14 has a more or less trapezoidal "dovetail" profile with a narrower mouth 15.

Figure 7:
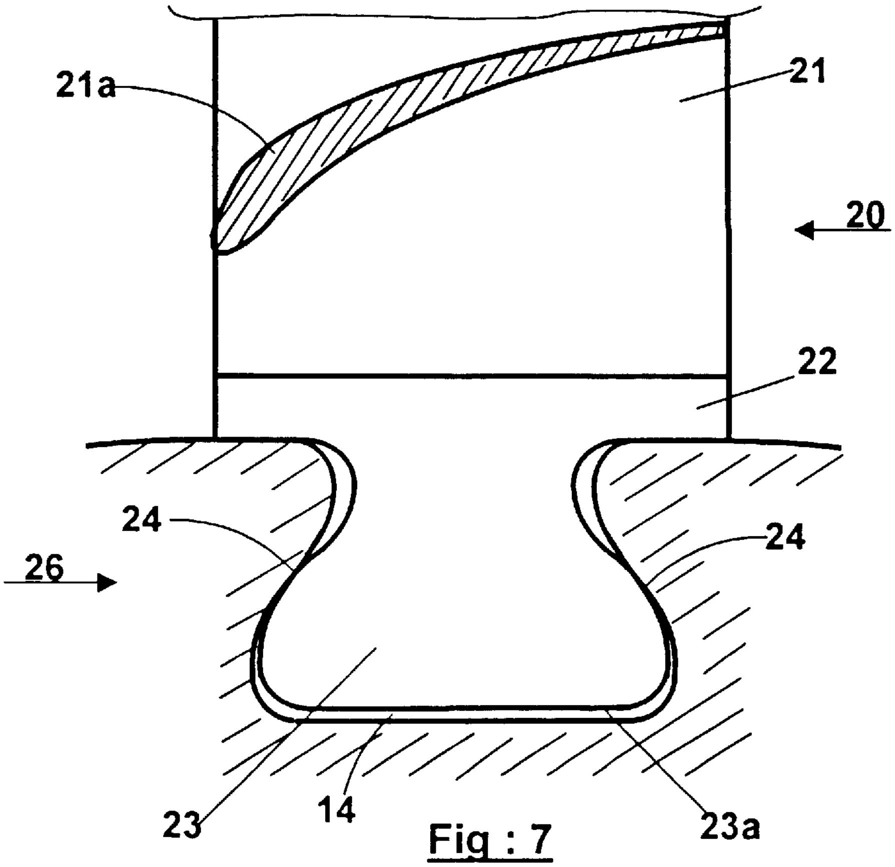
FIG. 7 is a cross-sectional view of a blade mounted in an annular groove of FIG. 6.

Reference will now be made to FIG. 7. A blade 20 comprises, in succession from top to bottom in this figure, a thin aerofoil 21, a platform 22 extending laterally on each side of the blade 20 and a root 23 of a more or less trapezoidal shape that complements the shape of the groove 14, the root 23 in this example being arranged transversely to the aerofoil 21. This figure also shows, for information, the section **21*a* of the aerofoil 21. The blade 20 is fitted via its root 23 into the annular groove 14 with a limited clearance and is immobilized by locking means not depicted. Each annular groove 14 thus accommodates a number of blades 20, the root 23 of which is introduced through the local opening, referenced 18 in FIG. 6, and brought into position by sliding along the annular groove 14. The root 23 comes into contact with the annular groove 14 along two lines of contact 24 which are also annular and situated to the rear of the mouth 15. The term "attachments 26 for attaching the blades 20" is to be understood also as meaning the annular groove 14 and the roots 23**.

Figure 8:
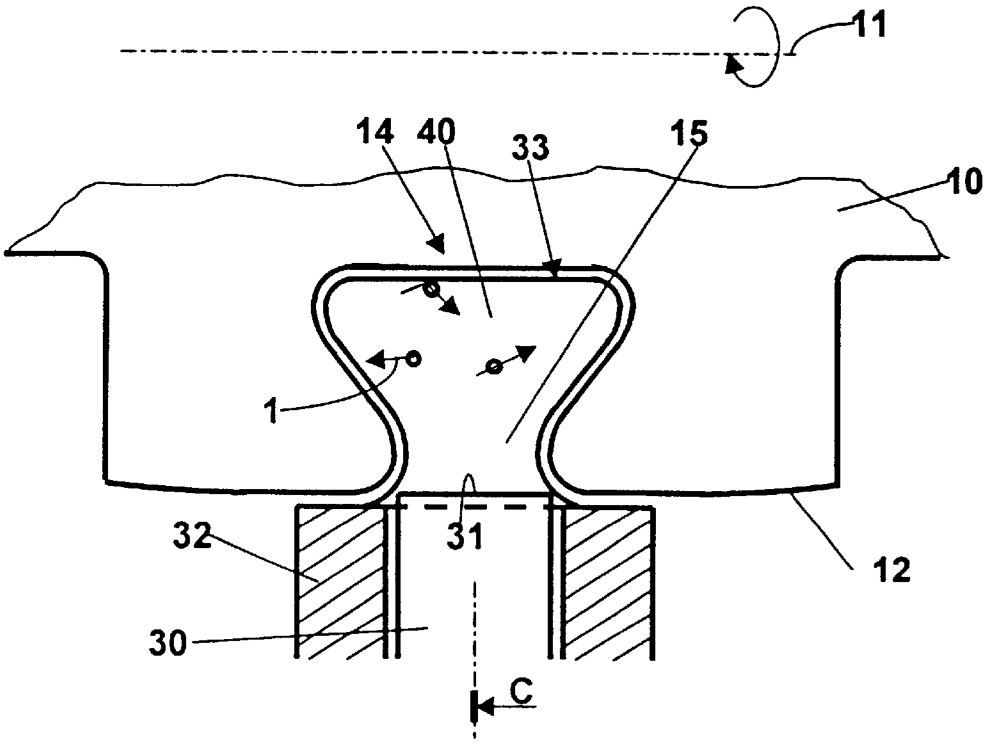
FIGS. 8 and 9 illustrate in a front view and a profile view respectively, a method of ultrasonically peening the annular grooves. Following the model of the previous example.
Figure 9:
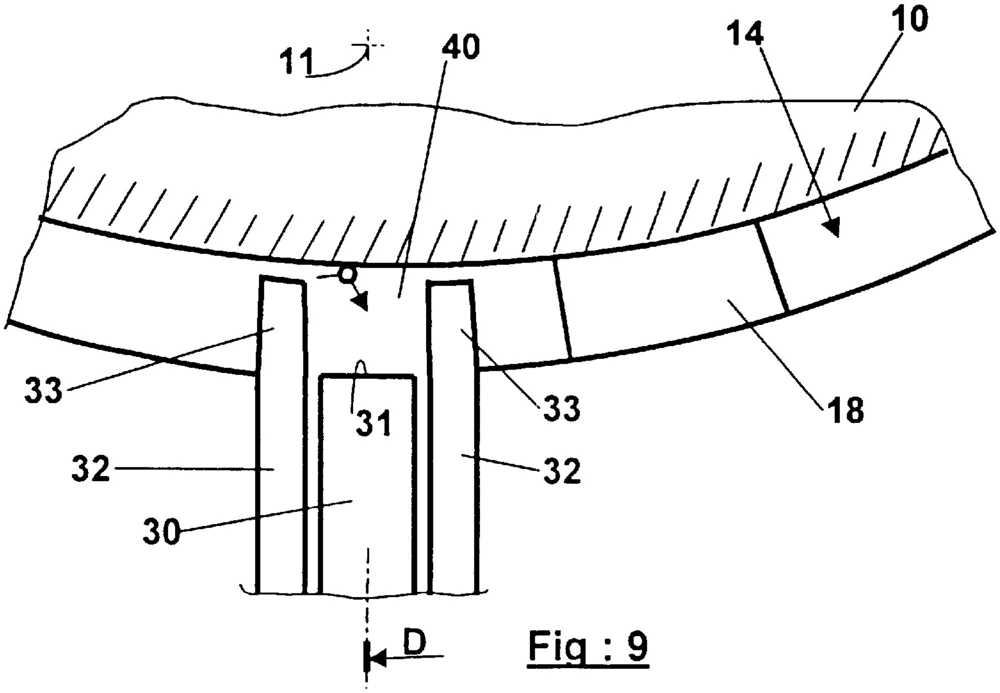

Reference will now be made simultaneously to FIGS. 8 and 9. The sonotrode 30 comprises a vibrating surface 31 capable of being introduced into the mouth 15 of the groove 14. The sonotrode 30 slides in a sleeve 32 with a clearance smaller than the diameter of the beads 1. The sonotrode 30 can be sealed to the mouth 30 with respect to the beads by the sleeve or by any other means. In a preferred embodiment, however, this sealing is most simply achieved by giving the sonotrode 30 a rectangular cross section with a width equal to that of the mouth 15, less a clearance smaller than the diameter of the beads 1. The sleeve 32 supports two wings 33 one on each side of the sonotrode 30, these wings being capable of sliding in the annular groove 14 with a clearance smaller than the diameter of the beads 1. It will be understood that the sonotrode 30 and the wings 33 collaborate to contain the beads 1 inside a portion of the annular groove 14 and against the walls of this groove 14.

With such a device, the method for the ultrasonic peening of an annular groove 14 comprises the following operations:

- arranging the rim 10 over the sonotrode 30 in an appropriate position for causing the annular groove 14 to travel over the sonotrode 30 by rotating the rim 10 about its geometric axis 11,
- arranging a dose of beads 1 on the sonotrode 30, the sonotrode preferably being retracted into the sleeve 32 so as to constitute, above its vibrating surface 31, a receptacle capable of containing the beads 1,
- presenting the local opening 18 over the sonotrode 30,
- bringing the sonotrode 30 and the two wings 33 into the local opening 18, the sonotrode 30 being level with the mouth 15 and aligned with this mouth 15, the two wings 33 lying one on each side of the sonotrode (30) and aligned with the axial groove (14),
- turning the rim 10 and setting the sonotrode 30 in vibration when the two wings 33 and the sonotrode 30 are in the annular groove 14,
- stopping the sonotrode 30 as soon as a wing 33 comes out in the local opening 18,
- stopping rotation of the rim 30 when both wings 33 and the sonotrode 30 are in the local opening 18.

Figure 10:
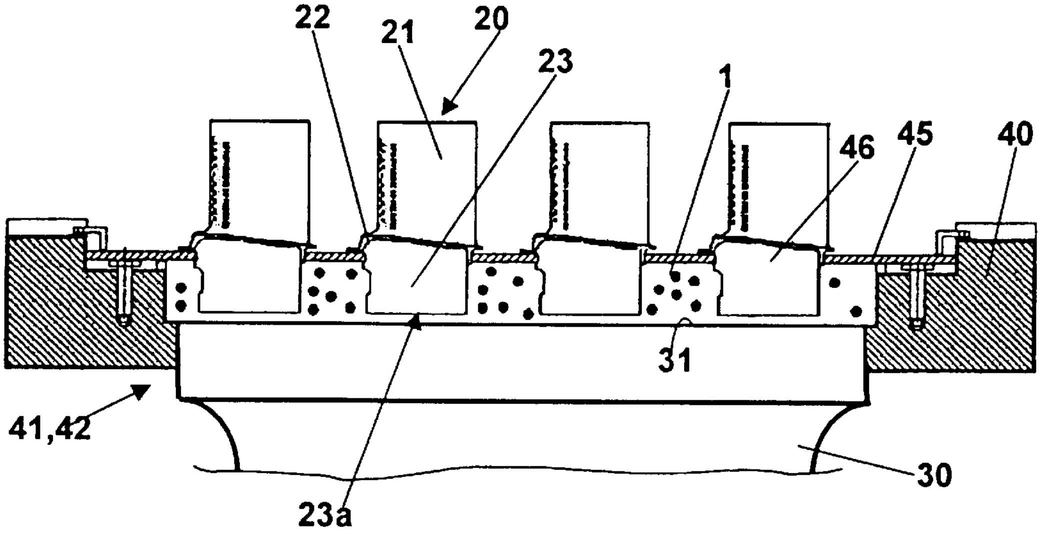
FIGS. 10 and 11 illustrate, in a front view and a view from above respectively, a method of ultrasonically peening the blade roots, FIG. 10 being a view in section on E of FIG. 11.
Figure 11:
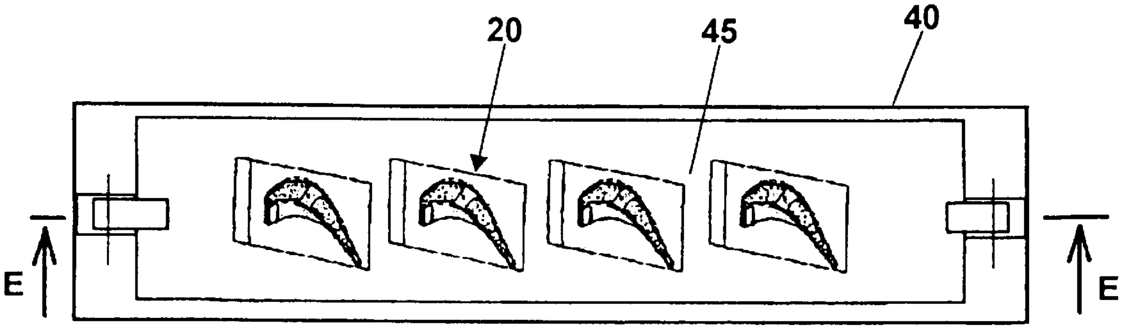

Reference will now be made simultaneously to FIGS. 10 and 11. To peen the roots 23 of the blades 20, use is made of a chamber 40, including a bottom 41 having an opening 42 through which a sonotrode 30 passes with a clearance smaller than the diameter of the beads 1, the chamber 40 being covered by a, preferably thin, lid 45, the lid 45 having a number of openings 46 of a shape that complements the roots 23 to be treated, the distance between the lid 45 and the sonotrode 30 being at least equal to the height of the roots 23, which have a base **23*a*, so that the bases 23*a* of the roots 23 do not touch the sonotrode 30**.

With such a device, the method for the ultrasonic peening of the roots 23 of the blades 20 comprises the following operations:

- introducing a dose of beads 1 into the chamber 40,
- introducing the roots 23 into the openings 46 of the lid 45 and immobilizing the blades 20 on the lid 45, setting the sonotrode 30 in vibration to carry out the peening.

One advantage of the method is that it avoids coating with a protective coating those parts of the blade which do not need to be peened, namely the platform 22 and the aerofoil 21, this protection being afforded by the lid, the platform 22 and the aerofoil 21 remaining behind the lid 45 outside the chamber 40.

Advantageously, the roots 23 are positioned above the vibrating surface 31 of the sonotrode 30 so as to ensure homogeneous peening of all the roots 23.

Advantageously also, the blades 20 having a cooling cavity opening at the base 23*a* of the root 23, this base 23*a* is positioned at a distance from the sonotrode 30 which is smaller than the diameter of the beads 1 so as to prevent the beads 1 from entering the cooling cavity.

We claim:

1. A method for a rotor blade assembly comprising a rotor and a plurality of blades removably attached to said rotor, said rotor comprising a rim having a periphery to which each of said plurality of blades is attached by attachments comprising first and second components, said first component comprising a dovetail groove arranged in said periphery of said rim, and said second component comprising a root formed on said blade, said root being of a shape that complements said groove and being able to be fitted into said groove so as to attach said blade to said rim, a method for extending the life of said attachments by peening a surface of at least one of said first and second components so as to create compressive prestress at said surface, said method comprising the steps of:

providing a sonotrode;

forming a chamber which is delimited at least partly by said sonotrode and the surface which is to be peened;

providing a plurality of beads in said chamber; and vibrating said sonotrode whereby said beads are mobilized in said chamber by the percussion of said sonotrode so that said beads are projected against said surface to effect ultrasonic peening of said surface with an Almen intensity at least equal to F8A.

2. A method according to claim 1, wherein said beads have a diameter at least equal to 0.8 mm.

3. A method according to claim 1, wherein said component is made of a material selected from the group consisting of steel, titanium alloy, chrome-based superalloy, or nickel-based superalloy, and wherein the prestressing is at least 500 MPa.

4. A method according to claim 1, wherein said dovetail grooves are arranged axially in said periphery of said rim, said axial grooves bing approximately straight and open at each end, and wherein said sonotrode is capable of being introduced into said grooves and includes means for sealing said sonotrode in said grooves and two wings capable of covering said open ends of said grooves and of closing the open ends off with a clearance smaller than the diameter of said beads, said method further comprising the steps of:

arranging said rim above said sonotrode in an appropriate position for bringing each axial groove over said sonotrode by rotating said rim about its geometric axis;

arranging said plurality of beads on said sonotrode;

turning said rim to bring each axial groove in turn over said sonotrode, each axial groove then being subjected to the steps of:

covering said open ends with said wings and bringing said s sonotrode into said axial groove, peening said axial groove by setting said sonotrode in vibration, withdrawing said sonotrode.

5. A method according to claim 1, wherein said dovetail grove is arranged annularly in said periphery of said rim, said annular groove including a mouth, and a local opening for insertion or removal of said roots of said blades, and wherein said sonotrode is capable of being introduced into said mouth of said annular groove and includes means for sealing said sonotrode in said mouth, and two wings are capable of passing into said annular groove with a clearance smaller than the diameter of said beads, said method further comprising the steps of:

arranging said rim over said sonotrode in an appropriate position for causing said annular groove to travel over said sonotrode by rotating said rim about its geometric axis;

arranging said plurality of beads on said sonotrode;

presenting said local opening over said sonotrode;

bringing said sonotrode and said two wings into said local opening, said sonotrode being level with said mouth and aligned with said mouth, said two wings lying one on each side of said sonotrode and aligned with said axial groove;

turning said rim and setting said sonotrode in vibration when said two wings and said sonotrode are in said annular groove;

stopping said sonotrode as soon as a wing comes out in said local opening;

stopping rotation when both wings and said sonotrode are in said local opening.

6. A method according to claim 1, when applied to the peening of blade roots, wherein use is made of a chamber including a bottom, said bottom having an opening through which said sonotrode passes with a clearance smaller than the diameter of said beads, said chamber being covered by a thin lid, said lid having a number of openings of a shape that complements said roots, the distance between said lid and said sonotrode being at least equal to the height of said roots, said method further comprising the steps of:

introducing said plurality of beads into said chamber;

introducing said roots into said openings of the lid and immobilizing said blades;

setting said sonotrode in vibration to carry out said peening.

7. A method according to claim 6, wherein said sonotrode has a vibrating surface and all of said blades are positioned above said vibrating surface.

8. A method according to claim 7, wherein said blade roots each have a base, and a cooling cavity opening at said base of said root, and wherein said base is positioned at a distance from said sonotrode that is smaller than the diameter of said beads.

* * * * *